UNITED STATES PATENT OFFICE.

EDWARD N. SHELDON, OF BELLEVILLE, KANSAS.

HAIR-TONIC.

No. 841,057.  Specification of Letters Patent.  Patented Jan. 8, 1907.

Application filed March 17, 1906. Serial No. 306,655.

*To all whom it may concern:*

Be it known that I, EDWARD N. SHELDON, a citizen of the United States, residing at Belleville, in the county of Republic and State of Kansas, have invented certain new and useful Improvements in Hair-Tonics, of which the following is a specification.

This invention has for its object to provide a dressing which when applied to the scalp and hair will stimulate the former and promote the growth of the latter, while at the same time keeping the scalp free from dandruff or other secretions.

The preparation embodies kerosene, asafetida, and naphthalene compounded in approximately the proportion of ten pounds kerosene, one pound asafetida, and twenty pounds naphthalene. The asafetida when combined with the kerosene neutralizes the odor thereof and produces a mixture having a slightly pleasant odor. The naphthalene neutralizes any trace that may remain in the mixture of the peculiar odor of kerosene and imparts a not disagreeable perfume, besides adding to the characteristic quality of the compound in its peculiar action upon the hair and scalp.

In preparing the tonic cornmeal, bran, or pumice is placed in a receptacle and asafetida added thereto. The asafetida being insoluble, or nearly so, in kerosene-oil is first subjected to alcohol or other solvent to produce a solution, which is added to the absorbent material in the receptacle. To one pound of asafetida is added two pounds of alcohol or other solvent, and this solution is added to ten pounds of bran or other suitable absorbent. In the next step about ten pounds of kerosene is poured over the bran, pumice, or other absorbent saturated with the solution of asafetida and thoroughly agitated. Next about twenty pounds of naphthalene after being pulverized are added to the mixture and the whole agitated until the naphthalene is dissolved. The resultant mixture is either filtered or allowed to settle and the clear solution poured off and bottled for use. Any desired perfume may be added according to fancy. It is to be understood that the proportions of ingredients herein given may be varied.

Having thus described the invention, what is claimed as new is—

1. The herein-described hair-tonic consisting of kerosene, asafetida and naphthalene in about the proportions specified.

2. The herein-described filtered hair-tonic consisting of kerosene, asafetida and naphthalene, and a solvent for the asafetida in about the proportions specified.

3. The herein-described filtered hair-tonic consisting of kerosene, asafetida, naphthalene and alcohol in about the proportions specified.

In testimony whereof I affix my signature in presence of two witnesses.

EDWARD N. SHELDON. [L. S.]

Witnesses:
HUGH ALEXANDER,
E. W. WAGENER.